Nov. 19, 1940.          E. A. DOYLE          2,221,788
CUTTING METHOD AND APPARATUS
Original Filed July 3, 1935     3 Sheets-Sheet 1
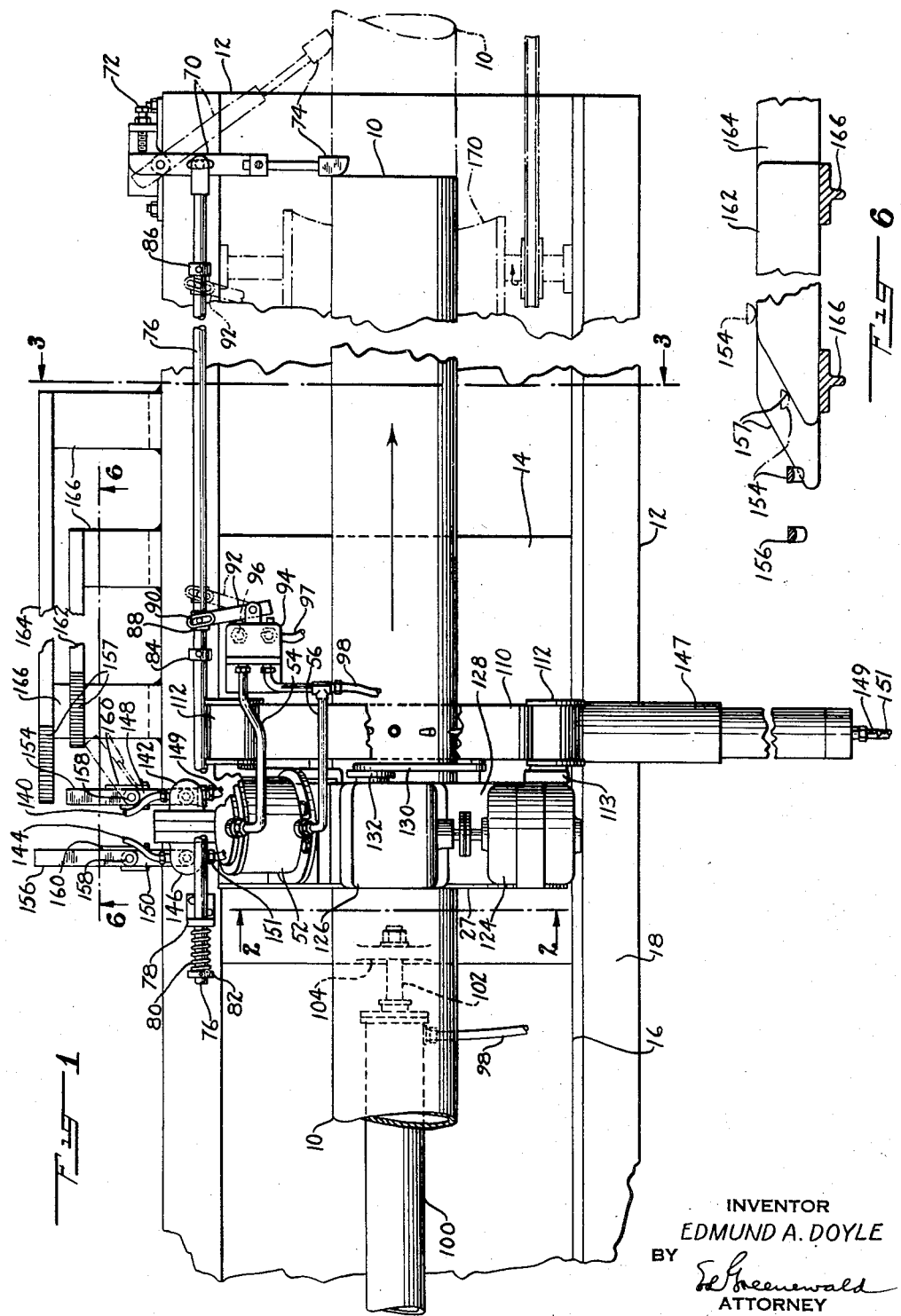
INVENTOR
EDMUND A. DOYLE
BY
E. Greenewald
ATTORNEY

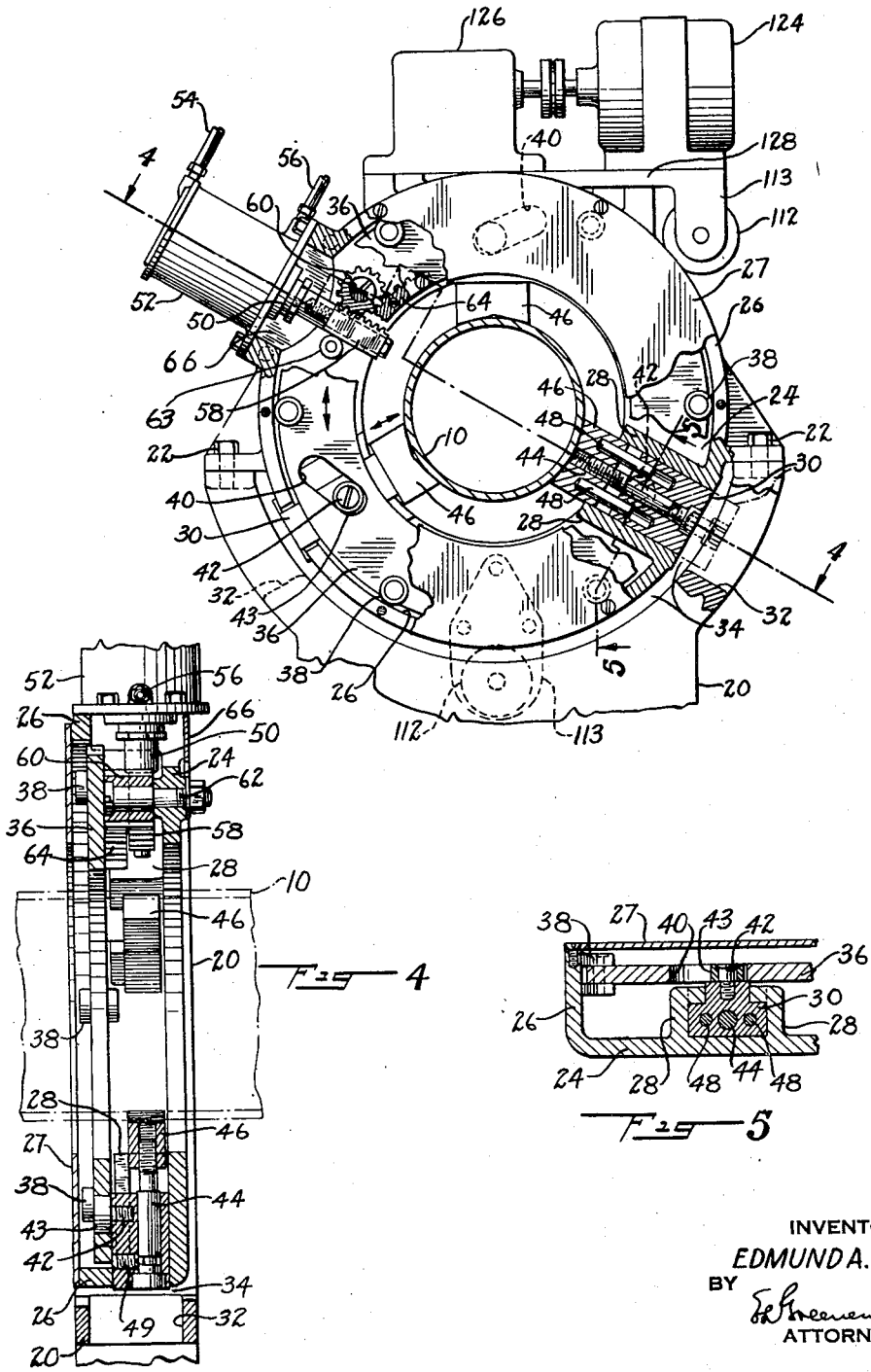

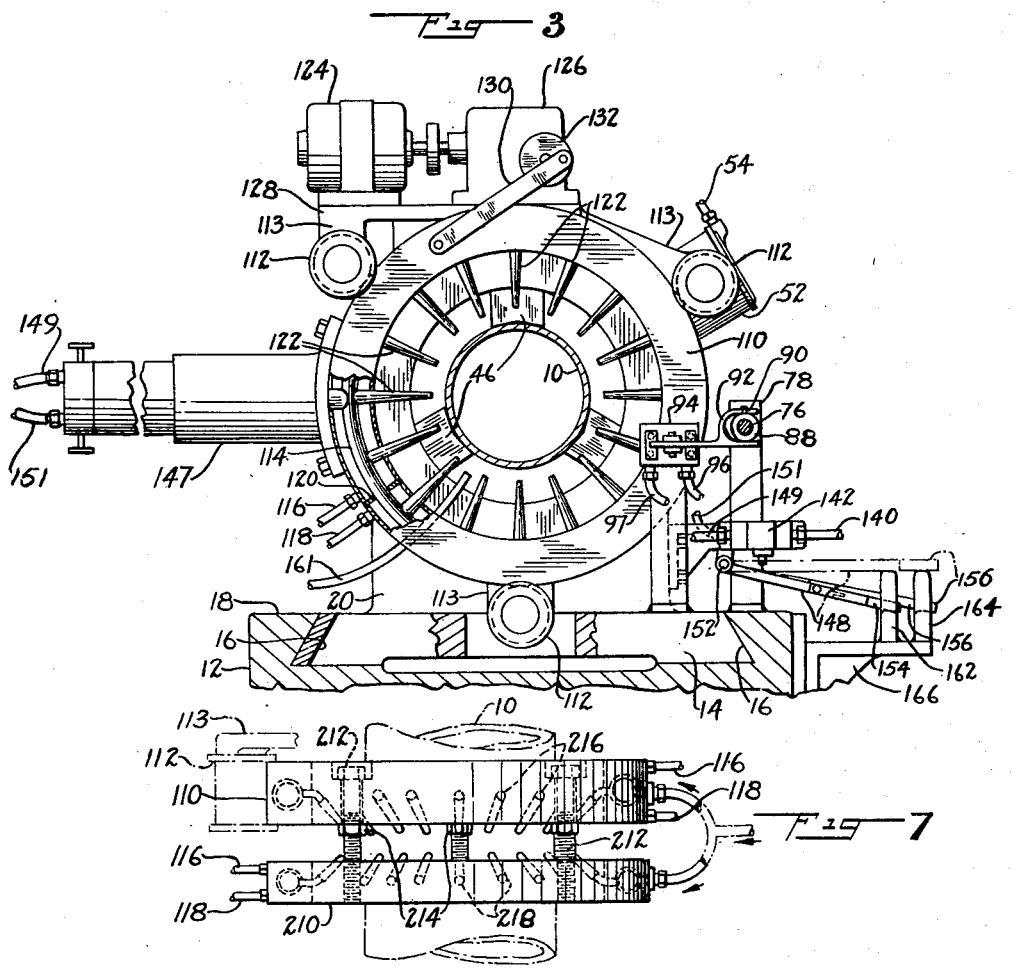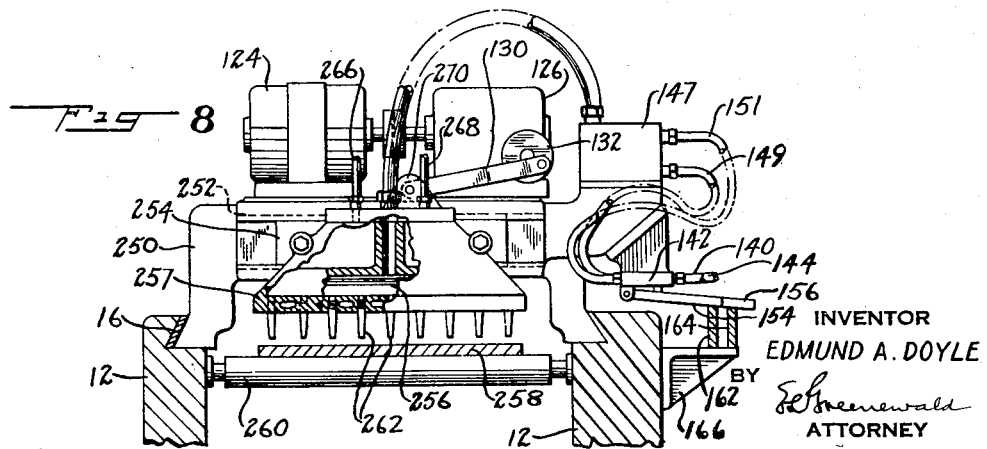

Patented Nov. 19, 1940

2,221,788

UNITED STATES PATENT OFFICE 2,221,788

CUTTING METHOD AND APPARATUS

Edmund A. Doyle, Brooklyn, N. Y., assignor to The Linde Air Products Company, a corporation of Ohio Original application July 3, 1935, Serial No. 29,637. Divided and this application September 30, 1939, Serial No. 297,236

13 Claims. (Cl. 266—23)

This invention relates to metal-cutting methods and machines; and more especially it concerns tube, plate, and bar-cutting machines which are automatic or semi-automatic in character. Certain forms of the invention have especial utility in the continuous cutting into predetermined lengths of ferrous metal articles, such as tubing, sheets, bars, strips, and the like. This application is a division of application Serial No. 29,637 filed July 3, 1935.

Metal tubing is now manufactured by certain well known processes which involve continuously welding the hot abutting edges of the skelp, as by applying air rich in oxygen to these hot edges and forcing them together. The skelp often is 100 ft. or more in length; and since the finished tube is hot, it may be sawed into appropriate lengths by means of a cold saw.

In other processes, especially those involving the use of electric welding machines for forming and welding cold moving skelp, it is impractical to cold-saw the resultant tubing into lengths. It is very difficult, in the use of saws and like severing mechanism, to make clean cuts through the moving tubing without tearing or damaging the metal at either side of the cut.

Apparatus is already known for cutting pipes, involving the use of one or more cutting torches, spaced apart longitudinally of the pipe and secured to a frame or carriage which is adapted to rotate around the pipe, or relatively to which the pipe is rotatable. Such apparatus is not suitable for the automatic continuous cutting into uniform lengths of pipe moving at high rates of speed or with only linear motion; and the advantages of securing an economic cutting operation with continuously reproducable results are not readily attainable.

Among the more important objects of the present invention are: To provide in novel manner for quickly cutting tubing or plate into predetermined lengths; to provide novel automatic tube cutting apparatus adapted for progressively conducting metal tubing past a cutting station; to provide in novel manner for the employment of a plurality of coplanar tips or nozzles in the rapid smooth cutting of tubing, plates, bars, and the like; to provide automatic means for continuously regulating the fuel gas and oxygen flowing to the tips or nozzles to secure a highly efficient use thereof during their cutting action, while avoiding fuel gas losses during brief periods between successive cutting operations; and to provide automatic means for returning the tips or nozzles to their initial cutting positions on moving pipe following each cutting operation. These and other important advantages will be clearly evidenced by the following description.

The apparatus features of the invention, according to one modification thereof especially designed for the cutting of continuously moving tubing, comprise means for gripping the tubing, preferably actuated by the moving tubing to be cut into lengths. This means is mounted upon a carriage which also supports a pluarlity of torches, carried by an annular member and disposed around the tubing and directed more or less radially towards the surface of the tubing. The carriage is movable backward and forward longitudinally of the tubing at a cutting station of selected length to locate the nozzles with respect to the work, or to permit the carriage to progress with the continuously moving tubing while cutting the same into selected lengths. Means are provided for oscillating the plurality of aligned torches or nozzles as a unit through a small arc of selected amplitude; and mechanism is provided for opening and closing at uniform intervals the respective valves feeding the combustible gas and cutting oxygen to the nozzles, and for quickly turning the carriage to the initial position after the completion of each cutting operation. A modified apparatus adapted to cut generally flat plates, bars, strips, and the like, comprises a manifold carrying a plurality of blowpipe nozzles adapted to be reciprocated with respect to the work in the central plane of the nozzles. Oxidizing cutting gas is projected from the nozzles along the line of cut as the nozzles move recurrently over the heated work.

Referring now to the accompanying drawings, wherein are illustrated certain embodiments of the invention:

Fig. 1 is a plan view of the apparatus at a cutting station, showing the carriage and associated parts, portions being broken away;

Fig. 2 is a vertical section, on an enlarged scale, taken along the lines 2—2 of Fig. 1, looking in the direction of the arrows, parts being broken away, and other parts being shown in section;

Fig. 3 is a vertical section taken along the lines 3—3 of Fig. 1, looking in the direction of the arrows, parts being broken away and parts shown in section;

Fig. 4 is an enlarged sectional view taken along the lines 4—4 of Fig. 2, looking in the direction of the arrows, parts being broken away;

Fig. 5 is a fragmentary sectional view along the line 5—5 of Fig. 2, looking in the direction of the arrows;

Fig. 6 is a sectional view taken along the line 6—6 of Fig. 1;

Fig. 7 is a somewhat diagrammatic plan view of a modified torch assembly; and

Fig. 8 is a vertical section through another form of torch assembly and associated parts, adapted for cutting flat metal elements, parts being broken away, and other parts being omitted.

The apparatus illustrated in Figs. 1 to 7 of the drawings is designed particularly for cooperation with a continuous tube welding machine, which draws ferrous metal material in the form of skelp from a furnace, and forms and welds the tube as the stock progresses through the said machine.

The tubing or other metal workpiece being fed continuously from a welding machine by any suitable means may be cut into sections of uniform length while the tubing is moving, and the severed sections then may be removed from the cutting zone by a conveyor of suitable type. Mechanism for severing the tubing comprises a reciprocating carriage upon which is mounted the cutting mechanism in the form of an oscillatory or reciprocatory member carrying a series of cutting torches. The reciprocations of the carriage may be controlled by the moving tubing through mechanism including a tripping member projecting into the path of the tubing, and adjustable longitudinally of the said path.

In the idle position of the carriage, the tubing is fed past the cutting device until the desired length has been measured off. The end of the tubing then operates the tripping member, causing a clamp mechanism to grip the tubing, whereupon is initiated a movement of the carriage in the direction of the feed of the tubing.

The cutting mechanism, mounted upon the movable carriage, is operated to impinge a plurality of cutting flames upon the pipe at points within a transverse plane through the latter, for a selected period of time, while moving the torches or nozzles back and forth along a fixed path of selected length in the said transverse plane to effect a rapid cutting operation. At a selected point in the path of travel of the carriage, the supplies of gas and oxygen to the torches may be cut off. As the carriage reaches the end of its path of movement with the tube, the tripping device operates a fluid pressure device which then acts quickly to release the clamp member and also to return the carriage to its initial position. The section of pipe cut off is removed from the path of the tubing by a suitable conveyor; and the tripping member then is returned to its first position in the path of the advancing tubing, ready for initiating a subsequent cycle of operations.

A pair of valves controlling the flow of oxygen and combustible gas to the apparatus are mounted upon the carriage, and have control levers adapted to engage the surfaces of cam members supported on the fixed frame and disposed in the paths of movement of the said levers during the time the carriage is moving in the direction the tube is traveling. One of the valves controls the feed of a combustible gas to the nozzles, for the initial heating of the tubing at the cutting zone. The other valve controls the flow of cutting oxygen under relatively high pressure to the nozzles. As each lever passes out of engagement with the corresponding cam surface, the valve controlled thereby automatically is closed. During the return movement of the carriage the articulated valve levers do not ride on top of the cam plates, but move alongside, thereby keeping the valves closed on the return stroke.

Referring now to Figs. 1 to 7 of the drawings, a continuous body or length of metal tubing 10 advancing from a tube mill, or the like, is supported upon the usual series of feed rolls (not shown).

Supported upon a stationary frame or table 12 for sliding movement is a bed plate or carriage 14 having bevelled side margins 16 engaged by corresponding grooved margins in the top surface 18 of the frame 12.

Mounted on the carriage 14 is a universal chuck mechanism, comprising a pedestal 20 having an upper surface arcuate in vertical section. Secured to the said surface, as by bolts 22, is an annular plate 24 having its outer margins curved to form a flanged portion 26. An annular cover plate 27 is secured, as by screws, to the flanged margins 26 of the plate. The flanged plate 24 is provided with three pairs of cooperating radially-disposed internal flanges 28, 28, positioned at points equidistant around the periphery of the plate. Each pair of flanges 28, 28, cooperate to house, for sliding movement radially of the plate 24, a generally T-shaped pressure-transmitting member 30. Apertures 32, 34, in the pedestal 20, and plate 24, permit radial sliding movement of the members 30 with respect to the said plate.

An annular rotatable camplate 36 is supported within the plate 24 upon rollers 38, the latter being adapted to ride freely upon the inside flanged margin 26 of the plate 24. Three diagonally-disposed, spaced cam slots 40 are provided in the camplate at points remote from its inner and outer margins. Pins or connecting members 42 are secured to the respective members 30, and each member 42 has a shouldered portion extending within a roller 43 and a corresponding slot 40 in the plate 36 for free movement within the slot. Adjustably secured to an inner end of each member 30, by means of a bolt 44, is a longitudinally-adjustable clamping jaw 46, adapted to be pressed radially against the tubing walls, and to be retracted therefrom. A pair of guide pins 48 have their respective end portions disposed within bores in the respective jaw 46 and member 30 of each associated group thereof, for assisting to maintain alignment of these members during their use. A set screw 49 facilitates locking each bolt 44 in selected position upon a member 30.

The arrangement of these parts is such that when the camplate 36 is rotated in one direction, each pin 42 and roller is forced toward one end of the corresponding slot, and thus acts through the member 30 and jaw 46 to retract the latter from contact with the tubing 10. When the camplate is rotated in the other direction, each pin is forced toward the opposite end of the slot associated therewith, and acts to force the jaw 46 into pressing engagement with the tubing, as indicated in Fig. 2.

For actuating the camplate to rotate the latter through a suitable arc, means are provided which include a double-acting fluid-operated pump mounted upon the flanged portion 26 of the plate 24, and having the usual piston operating in a cylinder 52 having ports connected with two air lines 54, 56. Secured to the piston rod 50 by a bolt is a short rack 58 adapted to engage with a pinion 60 rotatably mounted upon the bearing member 62 carried by the plate 24. A roller 63 mounted upon the plate 24 serves to support the rack and keep it meshed with gear 60 at all times, relieving piston rod 50 from strain.

A short arcuate-shaped rack 64 secured to the camplate 36 also meshes with the pinion 60. A removable cover 66 permits access to the air cylinder packing nut. The arrangement of parts is such that, upon actuation of the piston of the cylinder 52 in one direction, the camplate is rotated in one direction through a limited arc; and that when the piston moves in the opposite direction, a corresponding reverse movement of the camplate and associated parts occurs, thereby causing all of the clamping jaws 46 to act simultaneously to seize or release the moving tubing 10.

For actuating the cylinder to operate the clutch mechanism, means are provided including a longitudinally-adjustable tripper arm 70, pivotally mounted upon the frame 12 at a suitable point beyond the carriage 14 in the path of travel of the tubing 10, for movement into and out of the line of travel of the pipe. The tripper has an adjustable stop member 72 for limiting its movement in one direction. The arm 70 has at its lower end a tube-riding member 74 of hardened metal having a curved surface in the side facing the oncoming tubing.

An air valve shipper rod 76 is carried by the frame 12, and is supported for longitudinal sliding movement upon a pedestal or bearing member 78 secured to the frame. A compression spring 80 is disposed between the bearing 78 and a collar 82 secured to the rod 76; while the other end of the rod 76 is pivotally connected with a midportion of the tripper arm 70. Adjustably secured upon the rod 76 are two spaced collars 84, 86, the positions of which are regulatable in well-known manner. Also mounted upon the rod between the collars 84, 86, for free longitudinal sliding movement is a collar 88 having pins on its outer surface adapted to extend through elongated slots 90 in the span of a yoke formed at an end of a lever 92. The latter forms part of a self-locking four-way valve 94 of well-known type, having a single inlet 96, (Fig. 3) an air exhaust line 97, and having two alternatively open and closed outlets. The valve has no neutral position. One of the said outlets is connected with the air line 54; and the other of said outlets is connected with the air line 56 and also, through a flexible connection 98, with a single-acting air cylinder 100. The latter has a piston provided with a piston rod 102 secured to a depending ear 104 of the carriage 14, for returning the latter to the initial or starting position after each cutting operation. In the position of the valve lever 92 shown in full lines in Fig. 1, the chuck is released, and air is operating the piston in cylinder 100; whereas in the alternate position, shown in dotted lines, the chuck is locked on the pipe, and air from the cylinder 100 is being exhausted through conduits 98 and 97.

The cutting of the moving tubing into the desired lengths is effected by a plurality of torches, disposed radially around the tubing, and operating as a unit. The mechanism used for this purpose, in the form of the invention shown in Figs. 1 to 6, includes an annular hollow tubular cutting head or manifold 110 mounted for rotary movement upon a plurality of flanged guide rollers 112 carried upon brackets 113 secured to or forming part of the pedestal 20 and plate 24, as shown in Figs. 1 to 3. A gas manifold 114 is disposed concentrically within the manifold 110. Water or other cooling fluid is circulated in the space between these manifolds, the same entering from inlet line 116 and leaving through the outlet line 118. A baffle 120 is disposed in the manifold 110 to facilitate circulation of the cooling medium. Each of a plurality of radially-disposed torch nozzles 122 has an end thereof in permanent communication with the gas manifold 114, and provides a fluid-tight connection with both manifolds 110, 114. The torch nozzles may be replaced by others of shorter or greater length to adapt the device for the cutting of tubing of any desired diameter and wall thickness, or the individual nozzles may be made adjustable radially in suitable manner.

For oscillating the battery of torches or nozzles 122 as a unit in a selected arc transversely of the tubing, there is provided a motor 124, and an interconnected reduction gear indicated generally at 126, both mounted upon a platform 128 carried by the housing plate 24. The reduction gear is operatively connected with the manifold 110 by means of a link member 130 pivotally connected at the respective ends with the said gear and with the manifold 110. The amplitude of the oscillation is regulated by varying the distance from the axis of rotation of a rotable member 132 to the point on such member at which the link 130 is connected thereto. By the employment of a universal motor the rate of oscillation may be regulated at will.

For introducing a combustible gas mixture to the manifold 114 during the initial stages of a cutting operation there are provided a combustible gas inlet line 140 leading to a plunger-type cut-off valve 142 of well known design, and an oxygen inlet line 144 leading to a similar cut-off valve 146, the said valves being mounted for movement with the carriage 14. The valves 142, 146, are connected with a mixer 147 (Fig. 3) through valve-controlled flexible lines 149, 151, respectively; and the mixer is in permanent communication with the manifold 114. The valves 142 and 146 have connected therewith the respective depending fulcrum levers 148, 150, each hinged as at 152 for vertical movement, and adapted, when in their lowermost position, to permit the valves normally to close but, when raised, to act to open the respective valves. The respective levers 148, 150 have aligned extensions 154, 156 hinged thereto, as at 158, for lateral pivotal movement from such alignment only in the direction of the forward movement of the carriage 14. Springs 160 mounted on the levers and extensions resist this pivotal movement and normally urge each of the extensions 154, 156 into alignment with its associated lever. Pilot light means 161 provides for igniting the combustible gas at the beginning of each operation.

For operating the valves 142, 146 at the proper intervals there are provided a pair of longitudinally-disposed cam members 162, 164, mounted upon brackets 166, 166, secured to the side of the frame 12, as by welding. The end of each of these members 162, 164, adjacent the extensions 154, 156, at the beginning of a cutting operation has its upper surface bevelled to form a sloping surface 157 extending into the path of movement of these extensions and upon which the latter are adapted to slide during forward movement of the carriage.

The cams 162, 164 preferably are so disposed that the valves 142, 146, are opened simultaneously upon initial movement of the carriage. The cam 162 is shorter than the cam 164; the length being such that the mixture of combustible gas and oxygen fed to the torches or nozzles 122 during movement of the carriage along this portion of its path of travel serves to heat the tubing adjacent to the nozzles to a heat suitable for a cutting operation whenever the workpiece initially is below the kindling temperature. As the extension 154 passes beyond the end of the cam 162, the lever 148 drops or is forced down by a valve spring in well-known manner, thereby cutting off the supply of combustible gas to the nozzles or torches. Oxygen continues to be supplied to the nozzles for the cutting operation until the extension 156 passes beyond the end of cam 164, at which time the valve 146 is closed, cutting off the oxygen. The length of the respective cams is such that the cutting operation is completed immediately prior to the tripping of the lever 92 by the collar 86, which causes the release of the tubing by the clamping members and the return of the carriage to its initial or starting position.

For supporting and quickly removing the cut off lengths of tubing, there may be provided a series of conveyor rolls such as that shown diagrammatically at 170, which rolls are driven through suitable means, such as the sprocket and chain shown, at a higher speed than the normal speed of the tubing past the cutting mechanism. Thus as soon as the cutting operation is completed the tubing quickly is removed, permitting the tripper member 70 to return to its initial position, shown in full lines in Fig. 1. Other suitable means for removing the cut tubing may be employed.

Figure 7 illustrates somewhat diagrammatically a modified form of cutting mechanism especially adapted for concurrently cutting tubing and bevelling the cut margins thereof. In the form shown, the manifold member 110 is similar to that shown in Figs. 1 and 3. A secondary or auxiliary manifold 210 is carried by the manifold 110 with the sides of the manifolds arranged in parallel planes. The manifolds 110 and 210 are adjustably secured together for movement toward and away from each other by means of the stud bolts 212, having thereon the lock nuts 214. The row or series of torch nozzles 216 of the manifold 110 in this modification is directed radially inward and also forwardly of a median plane through the manifold; while the row of nozzles 218 of the manifold 210 is directed inwardly and rearwardly of such median plane through the manifold, both rows thereby being inclined transversely relative to the central plane of the cut. Each of the manifolds 110, 210, is provided with cooling fluid inlet and outlet lines 116, 118. Obviously, either or both of the manifolds 110, 210, and the nozzles associated therewith, readily may be replaced by others provided with nozzles of different sizes or designs; or with nozzles having different spacings.

Referring now to the modification of the invention illustrated somewhat diagrammatically in Fig. 8, and which is especially adapted for the rapid cutting of elongated metal bodies such as flat metal plates or sheets, a supporting structure 250 is provided for a motor 124, reduction gear 126, oxygen and combustible gas valves, gas mixing chamber 147, and a manifold 256 and associated parts, generally similar to the corresponding parts hereinbefore described. The support 250 is in the form of a carriage, movable longitudinally along a frame 12 in manner similar to the carriage 14, being actuated by suitable means such as a double-acting air cylinder (not shown) controlled by a valve generally similar to valve 94. Mounted within grooves 252 in the forward side of the support 250 for sliding movement therein transversely of the path of travel of the carriage 250 is a reciprocable supporting member 254 having secured thereto an elongated narrow manifold 256 housed in a jacket member 257 extending substantially across the full width of a plate 258 to be cut. The latter is adapted to be supported upon a series of rollers 260 and moved along beneath the carriage 250. A plurality of torch nozzles 262 are secured in the base of manifold 256 and are arranged in a row in the same plane in which they reciprocate, transversely of the path of movement of the carriage 250. The manifold 256 is provided with the cooling jacket 257 having water inlet 266 and outlet 268.

The member 257 is connected with the member 132 of the reduction gear by the link 130, the latter being pivotally connected at its respective ends to the member 132 and to a boss 270 on the member 257.

In this form of the invention a clamping mechanism for the plate 258 is not essential. Any slippage of the plate affecting its rate of travel is relatively small, due to the large frictional coefficient. Any normal slippage may be compensated for in regulating the operation of the apparatus. If desired, however, any suitable means for selectively connecting and disconnecting the carriage 250 and the plate in the manner described may be employed. Thus, electromagnets may be mounted upon the carriage 250 at opposite sides of the frame 12. The operation of the electromagnets for suitably connecting and disconnecting the carriage and the plate is controlled by an electric switch connected with the lever operating the preheating gas valve, or that operating a valve similar to air valve 94. This construction is suitable for use with cold metal. The magnets are placed sufficiently remote from the row of flames that they do not receive too much heat from the latter. Mechanical means for gripping the plate at its opposite edges, and preferably operated by the usual gear-driven plate-supporting rolls, such as those of a rolling mill, likewise may be used, especially in cutting hot plate. The other parts are similar to those described in connection with the modification shown in Figs. 1 to 6.

In the operation of the device of Figs. 1 to 6, assume that tubing is moving from an automatic welding machine in the direction indicated by the arrow in Fig. 1, impelled at a suitable rate by mechanism which does not form part of the present invention. As the advancing end of the tubing 10 engages the member 74, the latter is moved about its pivot and rides against the tubing, at the same time moving the bar 76 and lever 92 to the right, introducing air under pressure into line 54 to actuate the clutch to grip the tubing, (the air lines 56 and 98 being open to the atmopshere), causing the carriage and parts mounted thereon to move with the pipe, sliding upon the frame or table 12. The motor 124 operates continuously to cause slow oscillatory motion of the manifold 110 producing recurrent movement of the nozzles 122 over the tube 10. As the valve extensions 154, 156, contact with the respective cam surfaces 162, 164, the valves are opened to supply gas and oxygen to the mixing chamber 147. The resultant flames impinge upon the outer surfaces of the tubing encircled by the manifold 110, and an annular zone of the tubing quickly is brought to a temperature required for cutting it. Upon further movement of the carriage the extension 154 passes beyond the end of the cam 162, and a spring or the like causes the lever 148 to drop and close the valve 142, cutting off the flow of combustible gas. The oxygen, however, continues to be supplied for the flame cutting operation until the extension 156 passes beyond the end of cam 164, this cam surface being of such length that the cutting operation is then completed.

Upon further movement of the tubing, the lever 92 engages the collar 86 on the shipper rod 76, and swings to the left (Fig. 1), releasing the air pressure in line 54, and feeding compressed air to the lines 56 and 98. This causes positive actuation of the clutch to release the pipe, and actuation of the piston in cylinder 100 quickly to retract the carriage to its initial position. During retraction of the carriage the extensions 154, 156, do not ride upon the cam surface, but swing on their vertical hinges 158 (as indicated in dotted lines in Fig. 1 with respect to extension 154). When they are clear of the cams they again are aligned with the levers 148, 150, under action of the springs associated therewith.

The end of the tubing in advance of the carriage is carried upon one or more rollers of a driven conveyor operating at a somewhat higher speed than that at which the carriage and tubing normally travel. Thus as soon as the cutting operation is complete, the cut section is removed, and permits the tripper 70 to return to its normal position. In this position the collar 84 cannot actuate the lever 92. Thereafter, as the tubing progressively moves, the forward end again contacts the tripper 70 which swings to the right and causes the collar 84 to actuate the lever 92, and the series of operations described above are repeated.

Welded tubing moving from automatic welding machines may move at a speed as high as 60 feet per minute. By the practice of the present invention it is possible to cut such tubing into short lengths,—such as 10 feet lengths,—within a period of as low as 10 seconds. That is to say, the carriage carrying the series of torches moves forward at the same speed as the tubing, meanwhile heating and severing it, and then the carriage returns to the starting position, ready for another cycle of operations, all within a period as short as 10 seconds.

The accurate positioning of the manifold 110 with respect to the tubing being cut is effected by suitable regulation of the individual clamping jaws 46 of the respective members 30. Thus it is possible to center the tubing with respect to the manifold when necessary to compensate for irregularities in tubing conformation due to any warping that may occur during or subsequent to its formation. Due to the oscillatory movement of the torch assembly, the flame cutting oxygen jets effect a clean cut or kerf along a sharply-defined line.

Furthermore, in the use of a combustion type cutting operation, it is not imperative that the cutting device be moved at exactly the same rate as the tubing or plate during all or any part of the operation, although such movement in unison is highly desirable. Thus the present cutting mechanism can function under conditions where flying shears and similar mechanical cutters would be destroyed or seriously damaged.

In the operation of the apparatus shown in Fig. 8, for the cutting of flat stock into predetermined lengths the carriage 250 may be moved from one end of the cutting station to the other by means of a double acting air cylinder having associated therewith parts generally similar to the corresponding parts shown in Fig. 1. The cylinder may be mounted either above or at the side of the moving plate 258. The manifold is reciprocated laterally of the stock during the cutting operation. Each nozzle operates recurrently over a limited zone or path in the manner previously described. After each cutting operation the air cylinder returns the carriage and battery of cutting torches to the initial or starting position. The construction of parts, and the operation of the motor, preferably are such that movement of the manifold in one direction begins substantially at the moment the valves open for the introduction of a combustible mixture to the manifold, at the beginning of each cutting operation.

It will be understood that it is not essential that so-called cutting nozzles be utilized for the cutting operations. Welding nozzles in certain instances may be used, especially for cutting small diameter, thin-walled tubing; or combinations of cutting nozzles and welding nozzles may be used to control the distribution of the heat and secure the most efficient cutting of the materials.

Furthermore, it is not necessary that all of the nozzles be operated. Any selected number thereof may be blanked off, or their functioning suspended. Thus every alternate nozzle only may be employed; or only those nozzles at the upper portion of the annular manifold 110 may be used.

The manifold may be equipped with any suitable number of cutting nozzles, depending upon the amplitude of the arc through which the nozzles are to move. Welding nozzles also may be employed, so disposed and operated that, after the preheating is accomplished and the combustible gas is shut off, the welding nozzles act as cutting nozzles. Combinations of cutting and welding nozzles advantageously may be used for flame cutting very small diameter thin-wall tubing.

It will be understood that the modifications of the invention specifically described supra are for purposes of illustration only, and that wide departures therefrom may be made within the scope of the appended claims. Thus a mixing chamber for combustible gas and oxygen may be placed in the gas inlet line 140; and the oxygen inlet line 144,—in addition to being connected as usual with the valve 146,—also may be connected with this mixing chamber by a cross-connection having therein a suitable pressure reducing means. When using such construction, the outlet lines 149, 151 from the respective valves 142, 146 may be connected directly with the manifold 114; and the cams 162, 164 are so designed and disposed that the valve 142 opens first, and later is closed, preferably when, or just after, the valve 146 opens. Thus it is possible to increase the flow of cutting oxygen to the manifold independently of any reduction in or cutting off of the flow of the heating gas mixture thereto.

While the present invention has special utility in the cutting of metal, its use is in nowise limited thereto; and it conveniently also may be utilized for severing preselected lengths of tubing, plates, bars, and rods made of glass, ceramics, and other materials.

The invention is susceptible of modification within the scope of the appended claims.

I claim:

1. A method of flame-cutting a metal body, which comprises directing a plurality of spaced flame-cutting jets upon said body within the plane of a desired cut; and while so directed, recurrently moving said jets as a unit in said plane along a selected path of fixed length, whereby said jets traverse a selected path upon said body and form a kerf therein.

2. A method of flame-cutting a metal body, which comprises concurrently directing a plurality of spaced flame-cutting jets upon said body within the plane of the desired cut; and repeatedly moving said jets back and forth as a unit at a selected rate in said plane along a selected path of fixed length, whereby said jets form a kerf in said body.

3. A method of flame-cutting a metal body, which comprises concurrently directing a plurality of spaced flame-cutting jets upon said body within the plane of the desired cut; and repeatedly reciprocating said jets as a unit within said plane along a fixed path of selected length, at a fixed rate, whereby said jets form a kerf in said body.

4. A method of flame-cutting a metal body, which comprises concurrently directing a plurality of spaced flame-cutting jets upon said body within the plane of the desired cut, and repeatedly oscillating said jets as a unit in said plane along a fixed curved path of selected length, at a predetermined rate, whereby said jets form a kerf in said body.

5. Method of severing sections of equal length from an elongated ferrous metal body while the latter is moving continuously in the direction of its length, comprising the steps of directing gaseous heating and cutting jets against said body in a plane extending transversely of the path of movement of said body; moving said jets in unison back and forth transversely of said path while said jets are directed against the surface of said body along a line within said plane; advancing said jets at the same rate as said body and for a predetermined distance parallel to said path while said jets are moving transversely of said path; shutting off a portion only of the gaseous supply to said jets during the advance of said jets, until the termination of such severing operation; and, at the end of such predetermined distance of advance, quickly restoring said jets to their initial position for a repetition of said severing operation.

6. Method of severing sections of equal length from an elongated ferrous metal body while the latter is moving continuously in the direction of its length, comprising the steps of directing gaseous heating and cutting jets against said body in a plane extending transversely of the path of movement of said body; moving said jets in unison back and forth transversely of said path while said jets are directed against the surface of said body along a line within said plane; advancing said jets at the same rate as said body and for a predetermined distance parallel to said path while said jets are moving transversely of said path; initially supplying said gaseous jets with fuel gas and oxygen during a portion only of the advance thereof to preheat said body; shutting off such fuel gas supply to said gaseous jets at the end of the preheat period while continuing oxygen supply thereto for severing said body; shutting off such oxygen supply to said jets after the termination of the severing operation; and, at the end of such predetermined distance of advance, quickly restoring said jets to their initial position for a repetition of said severing operation.

7. Method of severing successive sections of predetermined length from an elongated metal body which is continuously moving in the direction of its length, which method comprises directing a plurality of closely-spaced flame-cutting jets upon said body within the plane of a desired cut, repeatedly moving said jets as a unit relative to said body in said plane at a predetermined rate along a fixed path of selected length, while moving said jets in the same direction as the movement of said body and at the same rate of speed as the latter, thereby severing from said body a section thereof of predetermined length, interrupting said jets upon the completion of a severing operation, and subsequently directing the said jets upon another portion of said moving body within the plane of a second desired cut.

8. Apparatus for flame-cutting a metal body, comprising a plurality of spaced flame-cutting torch nozzles disposed within a common plane for projecting flame-cutting jets at spaced points along a line of cut on said body; and means providing recurrent movement of said nozzles as a unit relative to said body along a fixed path of selected length within said plane.

9. Apparatus for flame-cutting a metal body, comprising a plurality of spaced flame-cutting nozzles adapted to discharge flame-cutting jets upon said body within the plane of the desired cut; means for reciprocating said nozzles as a unit in said plane along a fixed path of selected length; and means for regulating the rate of reciprocation of said nozzles.

10. Apparatus for severing sections of equal length from an elongated ferrous metal body while the latter is moving continuously in the direction of its length, such apparatus comprising, in combination, a row of nozzles disposed in a plane extending transversely of the path of movement of said body and adapted to discharge gaseous heating and cutting jets; a support for said row of nozzles; means for moving said support and said nozzles in unison back and forth transversely of said path while the gaseous heating and cutting jets of the nozzles are directed against the surface of said body along a line within said plane; mechanism so constructed and arranged that said support and said row of nozzles are advanced at the same rate as said body and a predetermined distance parallel to said path while the support and nozzles are moving transversely of said path to sever said body; means rendered operative at the end of such predetermined distance of advance, to move said support and nozzles the same distance in a reverse direction parallel to said path and thereby return said support and said nozzles to their initial position for a repetition of such severing operation; means, rendered operative just prior to the initiation of such return movement, to interrupt the advance of said support and said nozzles; and means, rendered operative during the advance of said support and said nozzles, to shut off a portion only of the gaseous supply to said jets until such severing operation is completed.

11. Apparatus for severing sections of equal length from an elongated ferrous metal body while the latter is moving continuously in the direction of its length, such apparatus comprising, in combination, a row of cutting nozzles disposed in a plane extending transversely of the path of movement of said body and adapted to discharge gaseous heating and cutting jets; a support for said row of nozzles; means for supplying fuel gas and oxygen to said nozzles; means for moving said support and said nozzles in unison back and forth transversely of said path while the gaseous heating and cutting jets of the nozzles are directed against the surface of said body to sever the latter along a line within said plane; mechanism so constructed and arranged that said support and said row of nozzles are advanced at the same rate as said body and a predetermined distance parallel to said path while the support and nozzles are moving transversely of said path; means, rendered operative during the advance of said support and said nozzles, to shut off such fuel gas supply to said gaseous jets, until the termination of such severing operation; means, rendered operative after the termination of the severing operation and prior to the termination of the advance of said support and said nozzles, to shut off such oxygen supply to said jets until a repetition of the severing operation is initiated; means, rendered operative at the end of such predetermined distance of advance, to move said support and nozzles the same distance in a reverse direction parallel to said path and thereby return said support and said nozzles to their initial position for a repetition of such severing operation; and means, rendered operative just prior to the initiation of such return movement, to interrupt the advance of said support and said nozzles.

12. Apparatus for flame-cutting a metal body comprising at least one row of spaced flame-cutting torch nozzles for projecting flame-cutting jets at spaced points along a line of cut on said body; and power-driven means operable to recurrently move said nozzles as a unit relative to said body along a fixed path of selected length, whereby said jets are moved along said line of cut.

13. Apparatus for flame-cutting a ferrous metal body, comprising two rows of flame-cutting nozzles adapted to project separate rows of flame-cutting jets against a metal body along a predetermined line of cut; and means providing recurrent movement of each of said rows of nozzles in unison over a fixed path relative to said body, thereby moving said jets along said line of cut to form a cut in said body, said respective rows of nozzles being constructed and arranged to incline said respective rows of flame-cutting jets in opposite directions transversely of the central plane of said cut.

EDMUND A. DOYLE.